Oct. 7, 1947.                 D. A. DAY                    2,428,557
                  MOVABLE WING STRUCTURE FOR AIRPLANES
                         Filed Feb. 23, 1944
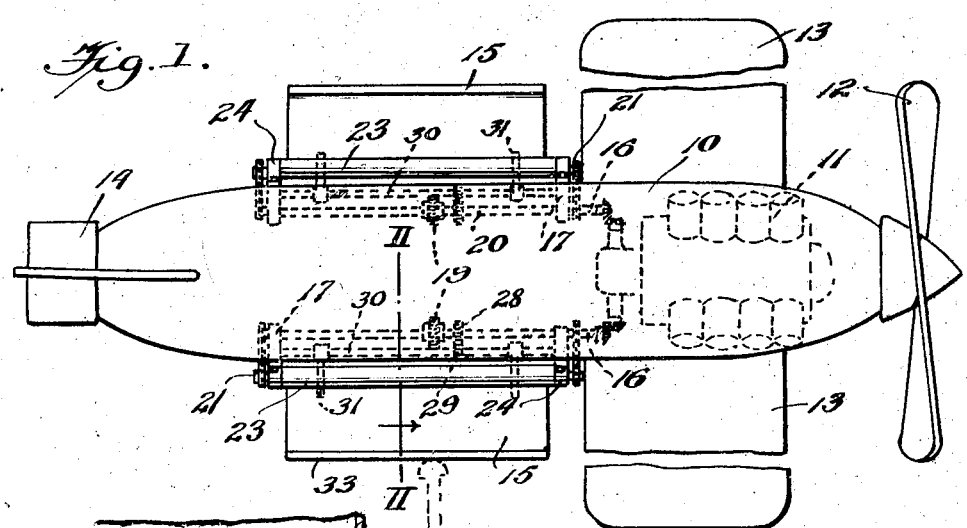
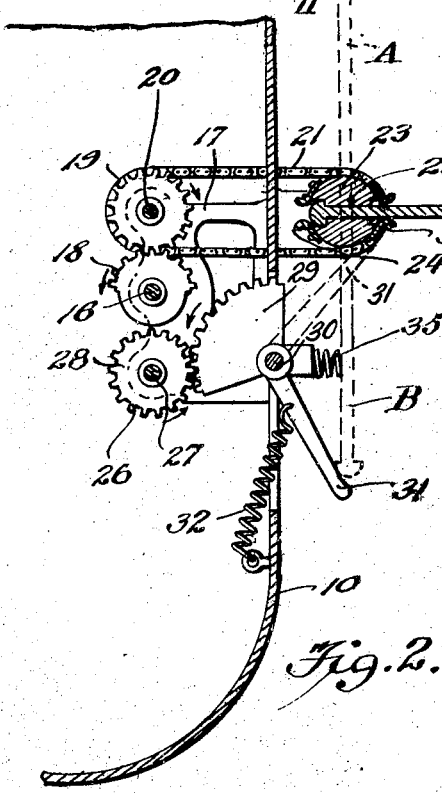
Inventor
Daniel A. Day
By W. S. McDowell
Attorney Patented Oct. 7, 1947

2,428,557

UNITED STATES PATENT OFFICE 2,428,557

MOVABLE WING STRUCTURE FOR AIRPLANES

Daniel A. Day, Columbus, Ohio

Application February 23, 1944, Serial No. 523,521

4 Claims. (Cl. 244—9)

This invention relates to aircraft, and more particularly, to aircraft of a modified ornithopteric type, involving the employment of power driven, partially rotating, wing sections.

It is an object of the invention to provide an airplane wherein use is made of auxiliary rotatably mounted wing sections adapted for the purpose of effecting more ready control in the flight of an airplane as compared with aircraft utilizing stationary wings, particularly in the matter of providing for lower flight-sustaining speeds, and, generally, enhanced safety.

It is another object of the invention to provide an aircraft having auxiliary movable wings disposed in longitudinal relationship with the body or fuselage, and wherein the movable wings are so mounted as to provide for turning movement thereof in a downward direction through an arc of approximately 180° and a linear return movement in a vertical plane parallel with the sides of the fuselage.

For a further understanding of the invention, reference is to be had to the following description and the accompanying drawing, wherein:

Fig. 1 is a plan view of an airplane having auxiliary and movable wing sections formed in accordance with the present invention;

Fig. 2 is a transverse vertical sectional view taken on the plane indicated by the line II—II of Fig. 1;

Fig. 3 is a fragmentary side elevational view.

Referring more particularly to the drawing, the numeral 10 designates the fuselage of an airplane formed in accordance with the present invention, the same being provided with a suitable engine 11 which drives a nose propeller 12. From the fuselage, there extends the usual stationary wings 13, and the rear of the fuselage is provided with standard rudder and elevator units 14.

The distinctive feature of my present invention resides in providing the fuselage at its sides with movable wings 15. The latter are adapted to be driven in any suitable manner from the engine 11 and, when in active operation, are so mounted that each thereof will turn about a horizontal axis in order that they may be each rotated in a downward direction through an arc of substantially 180° and then returned to an initial or starting position of rotation through sliding movement in a vertical plane, assuming the airplane to be in a normal horizontal position.

While such operations may be carried out with the use of many different types of mechanisms, the accompanying drawings illustrate somewhat diagrammatically one form of apparatus suitable for the purposes specified. However, it will be understood that I do not, except as hereinafter expressly defined, consider my invention restricted to the illustrated apparatus.

Thus, in the drawings, the engine 11 through suitable manually controlled speed and motion transmitting mechanism, drives a pair of shafts 16, which conveniently may be rotatably supported in bearings 17 provided on the fuselage. Each of the shafts 16 carries for rotation in unison therewith a semicircular gear segment 18, which, as shown in Fig. 2, meshes with the teeth of a gear 19 fixed to a countershaft 20, the latter being also supported for rotation in connection with the bearings 17. The ends of the shaft 20 may be provided with sprockets around which pass endless chains 21, the latter being also trained over corresponding sprockets provided on the stud shafts 22 of rocker drums 23. These drums are located externally of the fuselage in parallel longitudinal relationship therewith, and are supported for rotation in connection with the bearings 24 projecting rigidly from the fuselage. Each of the drums 23 is longitudinally slotted as at 25 for the reception of one of the movable wings 15.

Consideration of this structure will disclose that the rotation of the shaft 16 will impart corresponding rotation to the gear segments 18. These segments are timed to mesh with the gears 19 of the countershafts 20 when the movable wing sections 15 occupy the dotted line position A of Fig. 2 and to continue such meshing engagement until the wing sections 15 have been rotated through arcs of substantially 180°, and reach the second dotted line position indicated at B, in which the movable wing sections depend vertically from their drums 23.

When the rotating wing sections at each side of the fuselage reach their lowered positions B, the segments 18 disengage from the gears 19, discontinuing momentarily the application of rotating power to the drums 23. At this time, the segments 18 are brought into meshing engagement with gears 26 which are secured to rock shafts 27, journaled in the bearings 17 below the drive shaft 16. Each of these rock shafts carries a gear 28 which meshes with a complemental gear 29 provided on an adjacent parallel rock shaft 30. Each of the rock shafts 30 carries a pair of lifter arms 31, which project through slots provided in the fuselage. This is true when the rock shafts are disposed within the interior of the fuselage although it is within the scope of the invention to mount these shafts exteriorly of the fuselage, if desired. The outer ends of the lifter arms are normally disposed in the full line position shown in Fig. 2, so that when the wing sections 15 reach the positions indicated at B, the lower edges of these wing sections may be engaged by the outer ends of the lifter arms. When this engagement occurs, the gear segments 18 will have moved out of engagement with the gears 19 and into driving engagement with the gears 26 of the rock shafts 27, thus rotating said rock shafts to cause the arms 28 to move upwardly until they assume the dotted line positions indicated in Fig. 2, thereby raising the movable wing sections 15 and causing the same to slide linearly in vertical planes through the slots 25 of the rocker drums 23. If desired, the lifter arms may be connected with coil springs 32, so that when said arms have been elevated and the gear segments 18 removed from driving engagement with the gears 26, the springs will function to effect a quick return of the lifter arms 31 to their lowered positions, in order that they will be in registration with the outer edges of the movable wing sections when the latter reach their extreme downward positions of rotation.

The present invention thus provides a modified ornithopter type of airplane in which the auxiliary movable wings are employed to provide for relatively slow take-off, flying and landing speeds, thus increasing the safety and usefulness of airplanes generally. When maximum flight speeds are desired, the movable wing sections may be retained in positions feathered with or in the slip stream of the stationary wings in order to diminish frontal resistance. The opposite longitudinal edges of the movable wings 12 may be provided with enlargements 33, which engage with spring-pressed or resilient gripping devices 34 carried by the drums 23, such gripping devices serving to positively retain one side or the other of each of the movable wing sections in engagement with the rocker drums. Also, shock absorbing devices 35 may be used between the fuselage and the movable wing sections to arrest swinging movement of the latter in a downward and inward direction after driving engagement with the gear segments 18 has been momentarily discontinued.

I claim:

1. In an airplane, a body, an engine driven shaft supported by said body, a drum mounted exteriorly of said body for rotation about a horizontal axis, said drum being formed with a longitudinally extending slot projecting therethrough from one side to the other, a wing member slidably positioned in said slot and rotatable with the drum, means driven by said shaft for imparting intermittent rotation to said drum whereby to rotate said wing member outwardly and downwardly with respect to said body, and means operative during such period of non-rotation on the part of said drum to slide said wing member through said slot and restore the same to an initial position for rotation.

2. In an airplane, a body, an engine-driven shaft rotatably supported by said body, a wing member, supporting means for said wing member turnable about a horizontal axis and in which supporting means said wing member is slidably mounted, means driven by said shaft for intermittently rotating said supporting means, whereby to cause said wing member to rotate through a limited arc of movement, and means operative during periods of non-rotation of said supporting means to slide said wing member relative thereto, whereby to restore said wing member to an initial position for rotation before rotation of said supporting means is resumed.

3. In an airplane, a body, an engine-driven shaft rotatably supported by said body, a wing member, supporting means for said wing member carried by said body, said means being turnable about a horizontal axis and being provided with guides in which said wing member is slidably received, means driven by said shaft for intermittently imparting periodic rotation to said supporting means and said wing member, and means actuated by said shaft operative during periods of non-rotation of said supporting means to slide said wing member in said guides.

4. In an airplane, a body, an engine-driven shaft rotatably supported by said body, a wing member, supporting means for said wing member carried by said body, said means being turnable about a horizontal axis and being additionally formed with guides for slidably receiving said wing member, means driven by said shaft for imparting intermittent rotation to said supporting means and said wing, a rock shaft, lifter arms carried by said rock shaft, and means actuated by said engine-driven shaft for oscillating said rock shaft and lifter arms, whereby to effect sliding elevation of said wing member during intervals of non-rotation of said supporting means.

DANIEL A. DAY.

REFERENCES CITED

The following references are of record in the file of this patent:

UNITED STATES PATENTS

| Number | Name | Date |
|---|---|---|
| 1,304,187 | Lind | May 20, 1919 |
| 1,639,833 | Anderson | Aug. 23, 1927 |
| 1,237,318 | Flink | Aug. 21, 1917 |
| 1,084,798 | Grandquist | Jan. 20, 1914 |